(12) United States Patent
Mueller et al.

(10) Patent No.: US 6,173,925 B1
(45) Date of Patent: *Jan. 16, 2001

(54) SKIN-RIB STRUCTURE

(75) Inventors: Dietmar Mueller, Reinheim; Helmut Schuermann, Maxdorf, both of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/061,067

(22) Filed: Apr. 16, 1998

(51) Int. Cl.[7] ...................................................... B64C 3/44
(52) U.S. Cl. ........................... 244/219; 244/131; 244/123
(58) Field of Search ................................... 244/219, 123, 244/209, 208, 207, 131, 35 R

(56) References Cited

U.S. PATENT DOCUMENTS

| | | | |
|---|---|---|---|
| 1,341,758 | * | 6/1920 | Parker . |
| 3,109,613 | | 11/1963 | Bryant et al. . |
| 3,332,383 | * | 7/1967 | Wright . |
| 3,954,230 | * | 5/1976 | Machuta . |
| 4,053,124 | * | 10/1977 | Cole ...................................... 244/219 |
| 4,113,910 | * | 9/1978 | Loyd ...................................... 428/162 |
| 4,219,980 | * | 9/1980 | Loyd ..................................... 52/309.1 |
| 4,351,502 | * | 9/1982 | Statkus ................................... 244/219 |
| 4,427,168 | * | 1/1984 | McKinney et al. .................... 244/214 |
| 4,452,657 | * | 6/1984 | Hamm ..................................... 156/198 |
| 4,594,761 | * | 6/1986 | Murphy et al. ....................... 29/156.8 |
| 4,667,905 | * | 5/1987 | Hamm et al. ......................... 244/123 |
| 4,863,117 | * | 9/1989 | Riout . |
| 5,096,649 | * | 3/1992 | Hansson ................................. 264/258 |
| 5,114,104 | * | 5/1992 | Cincotta et al. . |
| 5,181,678 | * | 1/1993 | Widnall et al. ........................ 244/219 |
| 5,332,178 | * | 7/1994 | Williams ................................ 244/123 |
| 5,367,970 | * | 11/1994 | Beauchamp et al. ................. 114/140 |
| 5,476,704 | * | 12/1995 | Kohler ................................... 428/119 |
| 5,681,014 | * | 10/1997 | Palmer ................................... 244/219 |

FOREIGN PATENT DOCUMENTS

19653851 * 6/1998 (DE) .

* cited by examiner

Primary Examiner—Peter M. Poon
Assistant Examiner—Tien Dinh
(74) Attorney, Agent, or Firm—Evenson, McKeown, Edwards & Lenahan, P.L.L.C.

(57) ABSTRACT

A flexible skin-rib structure consists of fiber composite material for use in flow profiles with variable camber, especially airfoils or their components, in which a suction-side skin is connected with suction-side rib sections and a pressure-side skin is connected with pressure-side rib sections, with the respective suction-side and pressure-side rib sections being connected together by joints.

22 Claims, 2 Drawing Sheets

SKIN-RIB STRUCTURE

BACKGROUND AND SUMMARY OF THE INVENTION

The invention relates to a flexible skin-rib structure consisting of fiber composite material for use in flow profiles with variable camber, especially airfoils or their components, in which a suction-side skin with suction-side rib sections and a pressure-side skin with pressure-side sections are connected.

Modern airfoils are normally optimized for a limited range of applications. However, since a considerable portion of the take-off weight of an aircraft consists of the fuel that it carries, the weight of an aircraft decreases by up to 30% during flight. The lift/drag ratio (ratio of lift to drag) of the aircraft also deteriorates as a result of this increasing distance from the design point. With the aid of the variable camber of the trailing edge of the airfoil, for example, an adaptation can be made to the changed flight conditions. This means greater flexibility in application and more potential for additional developments later.

U.S. Pat. No. 3,109,613 teaches an internally adjustable, flexible skin-rib structure in which the pressure side and suction side skins are connected by rigid ribs, with the ribs being connected to the skins by hinge-like joints (piano hinges) to maintain flexibility.

A disadvantage of this design is that with camber, i.e. relative shifting of the skins with respect to one another, no bending moments can be introduced, leading to critical stresses in the vicinity of the skin-rib connection. Consequently this area is subjected to a double load: by the connection and by the bending moments. In addition, this design is difficult to create when fiber composite material is used to reduce weight, since a joint must be integrated into the skin-rib connection.

The goal of the present invention is to improve on the flexible skin-rib structure so that it is sufficiently rigid to handle aerodynamic stresses but remains capable of being deformed by small forces. It must also be economical and capable of being manufactured with lightweight construction. Another goal consists in relieving the stress on the connecting areas of the skins and ribs with a camber by reducing the stresses.

To achieve this goal, a skin-rib structure according to the invention of the type described above is characterized by the fact that the respective suction side and pressure side rib sections are connected with one another by joints.

In the skin-rib structure according to the invention, construction using fiber composite material is possible, guaranteeing extremely low weight; this avoids a situation in which the amount of fuel saved by adapting the airfoil profile is made up again by the additional weight of the material. In addition, the bending stresses that occur during camber are concentrated in the joint area inside the ribs, so that the skin-rib connecting area has the stress relieved and the maximum admissible material expansion values are not exceeded.

In one preferred embodiment, the suction-side rib sections are connected by suction-side joints with central rib sections, which in turn are connected by pressure-side joints with the pressure-side rib sections. In this form, the entire rib that joins the skins thus comprises a sequence composed of a suction-side rib section, a suction-side joint, a central rib section, a pressure-side joint, and a pressure-side rib section.

The fact that the rib sections and joints are arranged in a line offers several possibilities for aligning and attaching the joints between the rib sections. As a result of the movement transmitted to the joints during camber, the joints are preferably flectors. In one advantageous embodiment, the joints, like the rib sections, consist of fiber composite material. In this design, all of the rib sections and joints can be manufactured simultaneously when the ribs are made. In addition, a single component results that can be connected with the skins like a conventional rib without joints when the airfoil is constructed, thus saving on additional labor costs.

Preferably, the joints are produced by the suction side and pressure side rib sections tapering conically, then forming a joint where the thickness remains constant, and thickening conically again over a suction-side or pressure-side cone of the central rib section. In this manner, the joints are produced in the element itself, with the number of layers of fiber composite material being successfully reduced. The nature and form of this reduction of the layers can regulate both the shape of the conically-designed sections as well as the length and position of the rib sections and the length and position of the joints. The nature of the conical sections of the skin-side rib sections determines the distance of the joints from the skins. The stresses in the joints vary with the distance of the joints from the skins. However, the joint exerts the greatest influence on the stresses in the joint area itself by virtue of its length and thickness, with the stresses increasing with thickness. The joint length determines the area in which expansion is to take place. The shorter the length, the higher the stresses in the joint. The increased stiffness also increases the forces required for camber. Since the structure must be deformable by a limited expenditure of force while remaining sufficiently stiff to be able to accept aerodynamic loads, the skin-rib structure can be adapted to the various requirements by varying the joint thickness and joint length. These requirements can differ in an airfoil in the span direction, so that the joint length and joint thickness can also vary in this direction.

Since the ribs in the skin-rib structure according to the invention perform several tasks, it is advantageous for the alignment of the fibers in the fiber composite material to be adapted to these requirements, and there is a layered structure of the fibers that is adjusted to these requirements. Especially preferred is an embodiment in which the fibers in the joints run at angles of ±45° and 90° to the span direction, which is equivalent to saying that the 90°-direction runs in the rib-height direction. As a result of the layers that run in the ±45°-direction, the ribs can best accept the thrust that develops. Since the ribs in the structure according to the invention also are subjected to bending stress, the additional fiber layers preferably run in the rib-height direction to accept the bending stress.

With the preferred embodiment described above, the thrust and bending stresses in the joints can best be accepted and withstood. Since both the rib sections on the skin side and the central rib sections undergo a gradual thickening over the conical sections, the required stiffness of the skin-rib structure can be provided in the rib sections in addition to the fiber layers applied to the joint layers.

Advantageously, the entire ribs thus consist of two skin-side rib sections each and central rib sections that are connected by joints. All of these components consist of layers of fiber composite material. The only differences are in the number of layers and the orientation of the fibers. Thus, the joints consist of fewer layers than the rib sections and in part show a different orientation. In the rib sections, additional layers are applied to the already existing layers so that the fiber layers that form the joints also form the cores of the rib sections. The thickening takes place in stages over the conical sections.

The nature of the fiber composite material can remain constant over all of the applied layers, for example carbon-fiber-reinforced plastic, advantageously, however, the material in the different layers varies. Thus the 90° layers are preferable made of glass-fiber-reinforced plastic while the ±45° layers are made of carbon-fiber-reinforced plastic. The layers of the fiber composite material that are applied in the rib sections preferably consist of carbon-fiber-reinforced plastic.

The ribs that comprise the rib sections and the joints to form the skin-rib structure are connected with the respective skins by the pressure-side and suction-side rib sections.

This connection can be of any form but advantageously the pressure-side and suction-side rib sections are rigidly connected with the pressure-side and suction-side skins. Preferably the pressure-side and suction-side rib sections are permanently attached to the respective skins. Especially preferable, adhesive strips are formed on the pressure-side and suction-side rib sections, parallel to the skins. The strips are glued to the skins so that a rigid connection is guaranteed on both sides between the skin and the skin-side rib sections. The adhesive strips are formed when the layers of the fiber composite material that form the skin-side rib sections are bent at the angle between the skin and the rib during manufacturing. Thus the adhesive strips, skin-side rib sections, joints, and central rib sections form a unit and can be installed as a unit when the skin-rib structure is assembled. The hollow space formed by the adhesive strips and the skins is filled with the so-called gore, which is preferably made of carbon-fiber-reinforced plastic, guaranteeing a continuous connection between the skin and the rib.

The ribs can be connected to the skins, as described above, basically by an adhesive connection, but under certain conditions, for example with a particular load on the connection, it is advantageous for the skin-side rib sections to be riveted to the skins. At high peeling stresses, rivets prevent the adhesive layer from peeling away and causing the adhesive joint to fail.

Other objects, advantages and novel features of the present invention will become apparent from the following detailed description of the invention when considered in conjunction with the accompanying drawings.

DETAILED DESCRIPTION OF THE DRAWINGS

Figure 1:
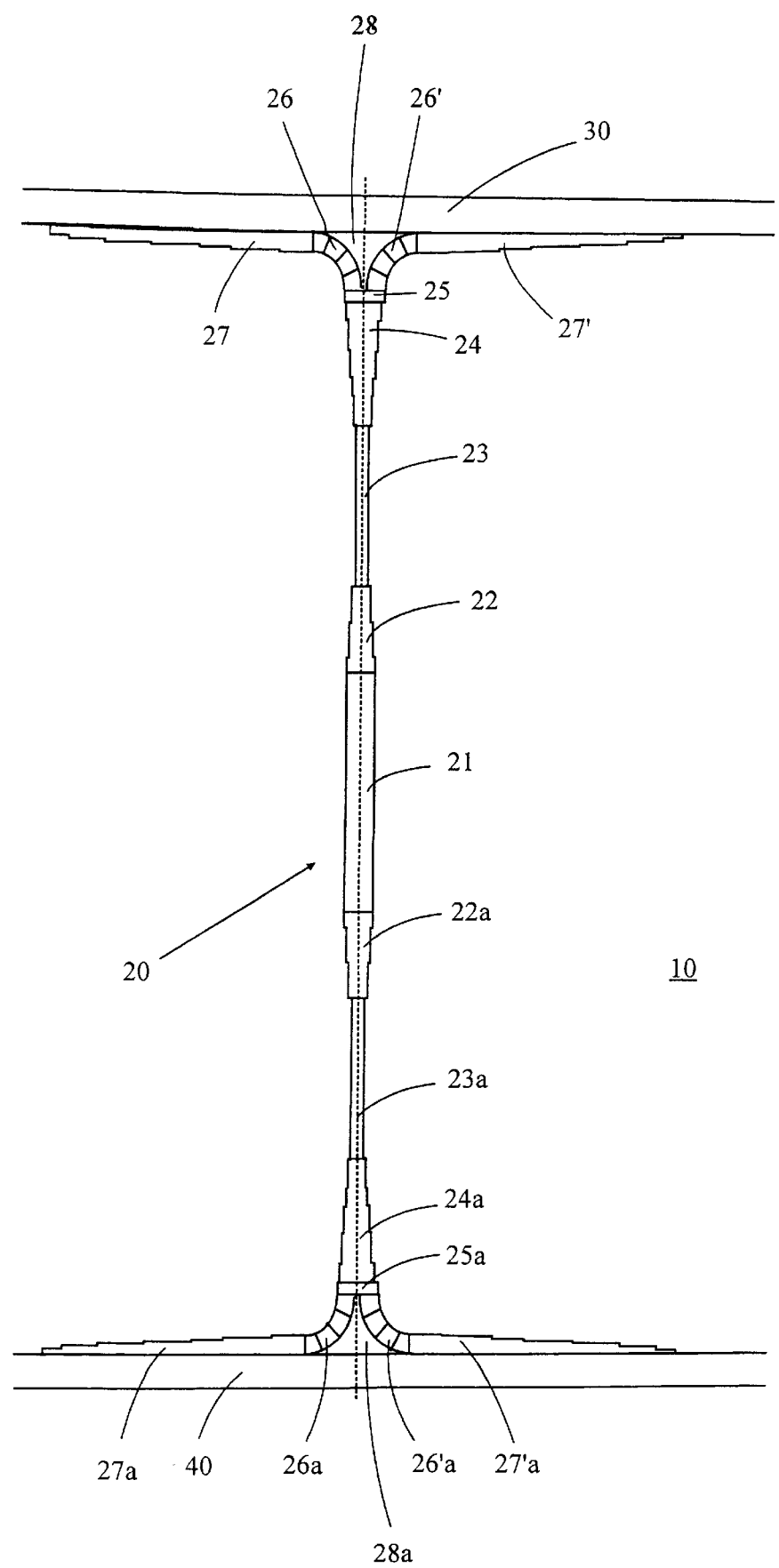
FIG. 1 shows a section in the flow direction through the skin-rib structure according to the invention, wherein only one rib is shown for reasons of symmetry.

FIG. 1 shows a section of a skin-rib structure 10 located in a flexible trailing edge of a landing flap, in which structure-limiting flexible skins 30,40 are connected with one another by a plurality of ribs 20 comprising suction-side and pressure-side joints 23, 23a, not shown in detail for the sake of clarity. Ribs 20 are mounted with spaces between them in the flow direction, resulting in a self-supporting flexible structure.

Rib 20 comprises suction-side adhesive strips 27, 27', by which the rib is connected with suction-side skin 30 by an adhesive connection. The suction-side adhesive strips 27, 27' turn into radii 26, 26' on the suction side, with their thickness decreasing outward from radii 26, 26', with the number of layers of fiber composite material successively decreasing. The space formed by suction-side radii 26, 26', and suction-side skin 30 is filled by a suction-side gore 28 so that the area between the two adhesive strips 27, 27' likewise contributes to the joining/adhesion between rib 20 and suction-side skin 30.

Suction-side radii 26, 26', which have a constant thickness in the embodiment described, merge into a suction-side rib section 25. This section 25 is made short in the embodiment described above since suction-side joint 23 is located close to suction-side skin 30. Rib 20 blends into suction-side joint 23 over a conical section 24 of suction-side rib section 25. In conical section 24, the number of layers of fiber composite material decreases successively until a thickness, in other words a number of layers, is reached that is the same as that of joint 23. The structure of rib 20 blends with a central rib section 21 over a suction-side conical section 22 of central rib section 21. In suction-side conical section 22, thickening again occurs as a result of the application of additional layers until the thickness of central rib section 21 is reached.

The structure of the pressure-side half of rib 20 from central rib section 21 over a pressure-side conical section 22a of central rib section 21, pressure-side joint 23a, a conical section 24a of a pressure-side rib section 25a, a pressure-side rib section 25a, and pressure-side radii 26a, 26'a, up to adhesive strips 27a, 27'a on the pressure side that are glued to the pressure-side skin 40 is made equivalent to that described for the suction side for reasons of symmetry.

Since the thickness in joints 23, 23a is minimal and the inner layers of rib 20 extend all the way through from suction-side adhesive strips 27, 27', to pressure-side adhesive strips 27a, 27'a, the arrangement of the layers at that location also determines the internal structure in conical sections 22, 22a, 24, 24a, in rib sections 21, 25, 25a, in radii 26, 26', 26a, 26'a, and in adhesive strips 27, 27', 27a, 27'a. In adhesive strips 27, 27', 27a, 27'a, the internal structure of the area directed toward skins 30, 40, is meant. Since adhesive strips 27, 27', 27a, 27'a occur here on both sides of rib 20, the layers that occur in joints 23, 23a are uniformly distributed over adhesive strips 27, 27', 27a, 27'a. Joints 23, 23a and hence the entire internal layer structure are composed of eight layers arranged symmetrically with respect to the center, for which reason only half the structure is shown.

In the innermost layer, the fibers lie at an angle of −45° when the 0° direction indicates the span direction. This is followed by a layer with 45° alignment and two layers with 90° alignment. The outermost layer consists of glass-fiber-reinforced plastic while the other layers are made of carbon-fiber-reinforced plastic.

On conical sections 22, 22a, 24, 24a, between joints 23, 23a, and rib sections 21, 25, 25a, and hence also on rib sections 21, 25, 25a themselves, radii 26, 26', 26a, 26'a, and adhesive strips 27 , 27', 27a, 27'a, six additional layers are applied on both sides which have a decreasing length in the outer areas of conical sections 22, 22a, 24, 24a and the ends of adhesive strips 27, 27', 27a, 27'a, so that the thickness increases slowly.

Figure 2:
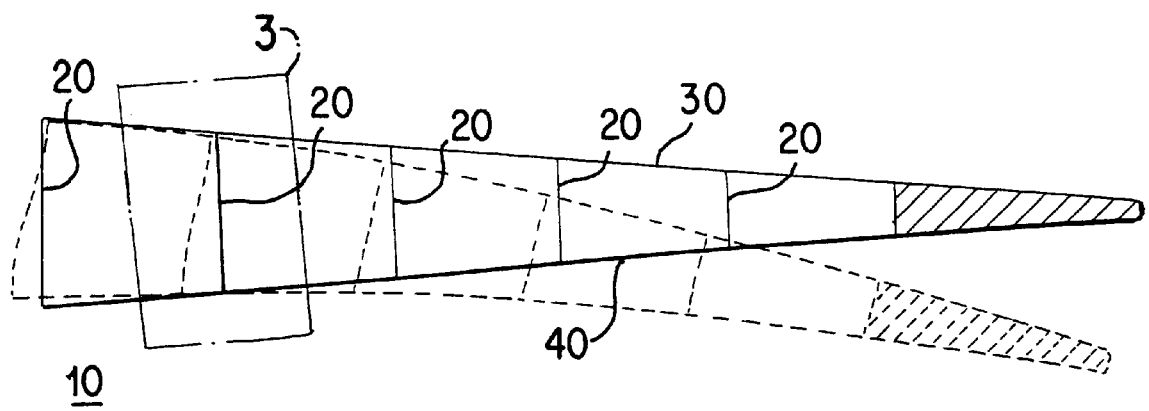
FIG. 2 is a section in the flow direction through a trailing edge of a flap of a flexible landing flap when the skin-rib structure according to the invention is used.

In FIG. 2, the trailing edge of the landing flap with skin-rib structure 10 is shown schematically in the non-cambered and downwardly cambered position. During the cambering of skins 30, 40, a bending moment develops in ribs 20 as a result of the relative displacement of skins 30, 40. Since ribs 20 are rigidly connected with skins 30, 40, the bending moments are concentrated at joints 23, 23a, with the load on the connecting point being eased. The same happens during upward cambering.

Figure 3:
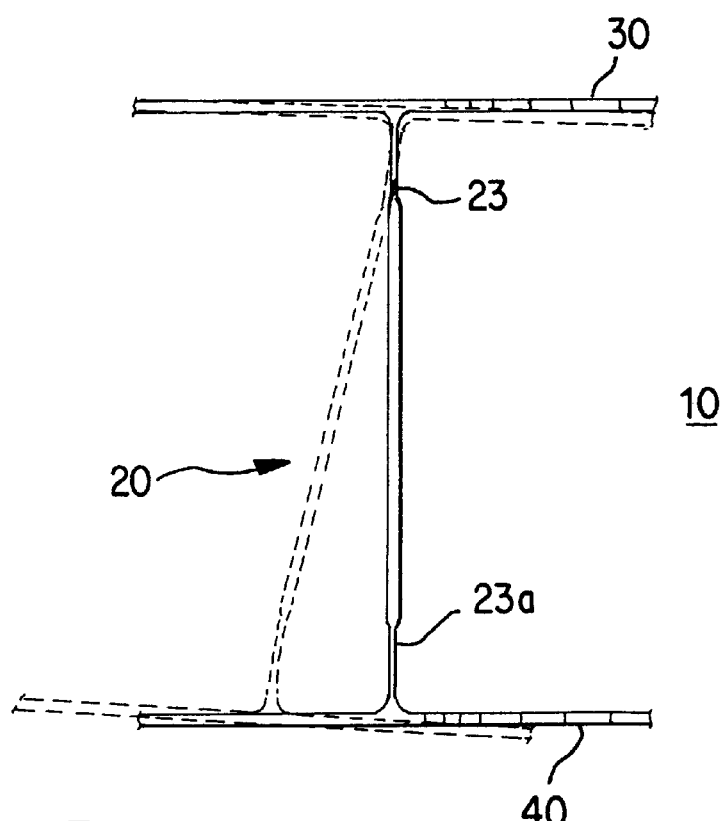
FIG. 3 is an enlargement of area 1 in FIG. 2.

This is particularly clear in the enlargement of section 1 in FIG. 2, shown in FIG. 3. During cambering, skins 30, 40 are displaced relative to one another so that ribs 20 must likewise deform. As a result of joints 23, 23a, this deformation takes place in the joints themselves so that the connecting points at which the majority of the bending stresses occur in skin-rib structures without joints are relieved of their loads.

In the embodiment described, skin-rib structure 10 is built up in several parts from pressure-side skin 40, suction-side skin 30, and ribs 20, with the various components being glued. However, structures are also possible in which all or at least some of the components are manufactured in one piece during production so that for example the layers of ribs 20 are continued in skins 30, 40, or in a skin.

In FIG. 2, the trailing edge of an airfoil is shown. Of course, the flexible skin-rib structure can also be used for all areas of flow profiles in which a camber or change in the profile is to be made. In addition, embodiments are also possible in which a cover layer is added between the skins and the adhesive strips and serves to cover the gore.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A flexible skin-rib structure of fiber composite material for use in flow profiles with variable camber, the structure comprising:
   a suction-side skin;
   a pressure-side skin;
   at least one rib interconnecting the suction side-skin and pressure-side skin, the rib including:
   a suction-side rib section connected with said suction-side skin;
   a pressure-side rib section connected with said pressure-side skin; and
   joints arranged between and connecting a respective suction-side rib section and pressure-side rib section with one another, wherein the points are blended into the respective suction-side rib section and pressure-side rib section.

2. The flexible skin-rib structure according to claim 1, wherein said structure is an airfoil.

3. The skin-rib structure according to claim 1, further comprising:
   at least one central rib section, wherein a suction-side one of said joints connects a respective suction-side rib section with said central rib section and wherein a pressure-side one of said joints connects a respective pressure-side rib section with said central rib section.

4. The flexible skin-rib structure according to claim 1, wherein said joints are bending joints.

5. The flexible skin-rib structure according to claim 3, wherein said joints are bending joints.

6. The flexible skin-rib structure according to claim 1, wherein said joints consist of a fiber composite material.

7. The flexible skin-rib structure according to claim 3, wherein said joints consist of a fiber composite material.

8. The flexible skin-rib structure according to claim 4, wherein said joints consist of a fiber composite material.

9. The flexible skin-rib structure according to claim 3, wherein said suction-side and said pressure-side joints are formed by tapering between the respective suction-side and pressure-side rib sections and the central rib section.

10. The flexible skin-rib structure according to claim 6, wherein a layered structure of said fiber composite material is created in said joints, said layered structure being adapted to thrust and bending stresses which develop in the flexible skin-rib structure.

11. The flexible skin-rib structure according to claim 7, wherein a layered structure of said fiber composite material is created in said joints, said layered structure being adapted to thrust and bending stresses which develop in the flexible skin-rib structure.

12. The flexible skin-rib structure according to claim 8, wherein a layered structure of said fiber composite material is created in said joints, said layered structure being adapted to thrust and bending stresses which develop in the flexible skin-rib structure.

13. The flexible skin-rib structure according to claim 10, wherein fibers used in said in joints run at angles of 90° and ±45° to a span direction.

14. The flexible skin-rib structure according to claim 11, wherein fibers used in said in joints run at angles of 90° and ±45° to a span direction.

15. The flexible skin-rib structure according to claim 12, wherein fibers used in said in joints run at angles of 90° and ±45° to a span direction.

16. The flexible skin-rib structure according to claim 10, wherein outer layers of said layered structure of fibers comprise glass fibers.

17. The flexible skin-rib structure according to claim 11, wherein outer layers of said layered structure of fibers comprise glass fibers.

18. The flexible skin-rib structure according to claim 12, wherein outer layers of said layered structure of fibers comprise glass fibers.

19. The flexible skin-rib structure according to claim 1, wherein said suction-side and pressure-side skins are rigidly connected with the suction-side and pressure-side rib sections.

20. The flexible skin-rib structure according to claim 1, wherein said suction-side and pressure-side rib sections are permanently connected with said suction-side and pressure-side skins, respectively.

21. The flexible skin-rib structure according to claim 20, further comprising adhesive strips formed on the suction-side and pressure-side rib sections running parallel to said suction-side and pressure-side skins, respectively, wherein said suction-side and pressure-side rib sections are glued to said suction-side and pressure-side skins via said adhesive strips.

22. The flexible skin-rib structure according to claim 20, wherein at least one of said suction-side and pressure-side skins is riveted to its corresponding suction-side and pressure-side rib section.

* * * * *